US009781380B2

(12) United States Patent
Hu et al.

(10) Patent No.: US 9,781,380 B2
(45) Date of Patent: Oct. 3, 2017

(54) METHOD, APPARATUS AND TERMINAL FOR PLAYING MULTIMEDIA CONTENT

(71) Applicant: Tencent Technology (Shenzhen) Company Limited, Shenzhen (CN)

(72) Inventors: Peng Hu, Shenzhen (CN); Hui Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 201 days.

(21) Appl. No.: 14/723,283

(22) Filed: May 27, 2015

(65) Prior Publication Data

US 2015/0256789 A1 Sep. 10, 2015

Related U.S. Application Data

(63) Continuation of application No. PCT/CN2013/087753, filed on Nov. 25, 2013.

(30) Foreign Application Priority Data

Nov. 28, 2012 (CN) .......................... 2012 1 0492929

(51) Int. Cl.
*H04N 5/93* (2006.01)
*H04N 21/439* (2011.01)
(Continued)

(52) U.S. Cl.
CPC ............. *H04N 5/93* (2013.01); *G11B 27/105* (2013.01); *H04L 65/602* (2013.01); *H04L 65/80* (2013.01);
(Continued)

(58) Field of Classification Search
None
See application file for complete search history.

(56) References Cited

U.S. PATENT DOCUMENTS 6,008,822 A * 12/1999 Yumoto .................... G06T 1/20
345/501
2006/0070104 A1* 3/2006 Shibutani ................. H04N 5/76
725/78
(Continued)

FOREIGN PATENT DOCUMENTS

| CN | 102055965 A | 5/2011 |
|---|---|---|
| CN | 102163201 A | 8/2011 |
| CN | 202551259 U | 11/2012 |

OTHER PUBLICATIONS

Tencent Technology, Written Opinion, PCT/CN2013/087753, Feb. 27, 2014, 10 pgs.
(Continued)

*Primary Examiner* — Eileen Adams
(74) *Attorney, Agent, or Firm* — Morgan, Lewis & Bockius LLP

(57) ABSTRACT

The present disclosure discloses method, apparatus, and a terminal for playing multimedia content, and relates to the field of computer technologies. The method includes: identifying a video encoding format, an audio encoding format, and a file format of a multimedia file; detecting whether the video encoding format can be processed by a graphics processing unit; when the video encoding format cannot be processed by the GPU, playing the multimedia file by using an application program that can process the video encoding format through a central processing unit; when at least one of the audio encoding format and the file format cannot be processed by the GPU, transcoding the multimedia file from the at least one format into a corresponding format that can be processed by the GPU; and sending the transcoded multimedia file to the GPU, so that the GPU plays the multimedia file.

12 Claims, 4 Drawing Sheets

102
Transcode a multimedia file from a format that cannot be identified by a GPU into a format that can be identified by the GPU, the format being one or two of an audio encoding format and a file format 104
Send the transcoded multimedia file to the GPU, so that the GPU plays the multimedia file

(51) Int. Cl.
*H04N 19/40* (2014.01)
*H04L 29/08* (2006.01)
*H04L 29/06* (2006.01)
*G11B 27/10* (2006.01)
*H04N 5/92* (2006.01)
*G10L 19/16* (2013.01)
*H04N 5/781* (2006.01)

(52) U.S. Cl.
CPC ........... *H04L 67/2823* (2013.01); *H04N 5/92* (2013.01); *H04N 19/40* (2014.11); *H04N 21/4398* (2013.01); *G10L 19/173* (2013.01); *H04N 5/781* (2013.01)

(56) References Cited

U.S. PATENT DOCUMENTS

| | | | |
|---|---|---|---|
| 2010/0060784 A1 | 3/2010 | Ansari | |
| 2012/0219233 A1* | 8/2012 | Uro | G06T 9/00 382/239 |
| 2014/0139513 A1* | 5/2014 | Mammou | G06T 9/001 345/419 |

OTHER PUBLICATIONS

Tencent Technology, IPRP, PCT/CN2013/087753, Jun. 2, 2015, 11 pgs.
Tecncent Technology, ISR PCT/CN2013/087753, Feb. 27, 2014, 2 pgs.

\* cited by examiner

METHOD, APPARATUS AND TERMINAL FOR PLAYING MULTIMEDIA CONTENT

RELATED APPLICATIONS

This application is a continuation application of PCT Patent Application No. PCT/CN2013/087753, entitled "METHOD, APPARATUS, AND TERMINAL FOR PLAYING MULTIMEDIA CONTENT" filed on Nov. 25, 2013, which claims priority to Chinese Patent Application No. 201210492929.1, entitled "MULTIMEDIA PLAYBACK METHOD AND APPARATUS, AND TERMINAL", and filed with the Chinese Patent Office on Nov. 28, 2012, both of which are incorporated herein by reference in their entirety.

FIELD OF THE TECHNOLOGY

The present disclosure relates to the field of computer technologies, and in particular, to method, apparatus, and a terminal for playing multimedia content.

BACKGROUND OF THE DISCLOSURE

A multimedia file is a file containing multimedia data, and data such as a video, an audio, and a subtitle are encapsulated in one multimedia file according to related specifications. Therefore, a format of a multimedia file includes two aspects, that is, an external file format and an inner-layer encoding format, where the file format refers to an encapsulation manner of multimedia data, for example, AVI, MOV, MKV, RMVB, or MP4; and the encoding manner refers to a compression algorithm of the multimedia data, for example, H.264, VP8, MPEG-4, WMV9, and the like are common video encoding formats, and MP3, AAC, AC-3, AMR, and the like are common audio encoding formats. In addition, the file format and the encoding format are not necessarily in a one-to-one correspondence because of a loose coupling between the file format and the encoding format. For example, a file format such as MP4 or MKV may contain different types of data encoding. However, there are also a few file formats, such as RMVB and WebM, used together with a uniquely specified video or audio encoding format.

Based on the foregoing multimedia file formats, there are mainly three phases, that is, media separation, media decoding, and media rendering, for playing a video file. Media separation is to identify a file format of a multimedia file by using an internal separator, obtain through separation encoding data such as a video, an audio, and a subtitle, and deliver the encoding data to a decoder. Media decoding refers to decoding video data and audio data by the decoder, to obtain restored uncompressed video data frames and audio data frames. Media rendering is to present, in an image manner by using a display device, the video data frames and the audio data frames obtained through decoding. In the three steps, the step of media decoding generally consumes the most calculation, which is much greater than that of separation and that of rendering, and is also greater than that of processing on the audio data. However, a processing capability of a central processing unit (CPU) of a device such as a mobile phone is limited, and therefore, a case in which playback is not smooth often occurs when a user uses a device such as a mobile phone to play a high resolution video. To make up for an inadequate video playback capability of the CPU, a graphics processing unit (GPU) chip supporting decoding of a multimedia file in a common format is built in most smart phones, and the multimedia file can be played by calling a system function of multimedia playback by the GPU.

In the existing technology, a GPU acquires a multimedia file in a specified format, obtains through separation encoding data of the multimedia file by using a separator, decodes the encoding data by using a decoder, and plays data frames obtained through decoding.

During an implementation of the present disclosure, inventors of the present disclosure find that the existing technology at least has the following problems:

A file format, a video encoding format, and an audio encoding format of a multimedia file played by the GPU all need to meet formats specified by the GPU, and the file format is fixed; as a result, a range of multimedia files that can be played by the GPU is limited.

SUMMARY

To solve a problem that a multimedia file cannot be played by a GPU when a format of the multimedia file cannot be processed by the GPU, embodiments of the present disclosure provide method, apparatus, and a terminal for playing multimedia content. The technical solutions are described as follows:

According to a first aspect, an embodiment of the present disclosure provides a multimedia playback method, including:

identifying a video encoding format, an audio encoding format, and a file format of a multimedia file;

detecting whether the video encoding format of the multimedia file can be processed by a graphics processing unit (GPU);

when the video encoding format cannot be processed by the GPU, playing the multimedia file by using an application program that can process the video encoding format through a central processing unit;

when the video encoding format can be processed by the GPU but at least one of the audio encoding format and the file format cannot be processed by the GPU, transcoding the multimedia file from the at least one format into a corresponding format that can be processed by the GPU; and sending the transcoded multimedia file to the GPU, so that the GPU plays the multimedia file.

Further, the step of transcoding the multimedia file from the at least one format into a corresponding format that can be processed by the GPU includes:

segmenting the multimedia file into one or more slice files, and using a current slice obtained through the segmentation as a current slice file;

transcoding the current slice file from a format that cannot be processed by the GPU into a format that can be processed by the GPU; and sending the transcoded current slice file to the GPU, so that the GPU plays the current slice file.

Further, the step of segmenting the multimedia file into one or more slice files, and using a current slice obtained through the segmentation as a current slice file includes:

determining a first slice point of the multimedia file;

locating a playback moment after a duration T from the first slice point;

detecting a first key frame greater than or equal to the playback moment; and using the playback moment corresponding to the first key frame, as a second slice point; and segmenting a portion of the multimedia file between the first slice point and the second slice point as the current slice file.

Further, the step of determining a first slice point of the multimedia file includes:

setting an initial playback moment of the multimedia file as a first slice point of the current slice file; or setting a second slice point of a previous slice file as the first slice point of the current slice file; or acquiring a user-specified playback moment, detecting a first key frame greater than or equal to the user-specified playback moment, and setting a playback moment corresponding to the first key frame as the first slice point of the current slice file.

Further, after sending the transcoded current slice file to the GPU, the method further includes:

when a second slice point of the current slice file is not the last playback moment of the multimedia file, setting a next slice file starting from the second slice point and transcoding the next slice file.

Further, the duration T corresponding to each slice file is the same or different, and a transcoding time of the current slice file segmented according to the current duration T is less than a remaining playback time of a previous slice file segmented according to a previous duration T in the GPU.

According to a second aspect, an embodiment of the present disclosure further provides a terminal, including: one or more processors; memory; and one or more program modules stored in the memory, the one or more program modules to be performed by the one or more processors, and the one or more program modules comprising instructions for performing the method described above.

According to a third aspect, an embodiment of the present disclosure further provides a non-transitory computer readable storage medium storing one or more program modules to be executed by a computing terminal having one or more processors, the one or more program modules comprising instructions for performing the method described above.

The technical solutions provided by the embodiments of the present disclosure have the following beneficial effects:

A format, in a multimedia file, that cannot be identified by a GPU is transcoded into a format that can be processed by the GPU, the format being one or two of an audio encoding format and a file format; and the transcoded multimedia file is sent to the GPU, so that the GPU plays the multimedia file, thereby solving a problem that a multimedia file cannot be played by a GPU when a format of the multimedia file cannot be processed by the GPU, and achieving an effect of expanding a range of multimedia files that can be played by the GPU.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objective, technical solutions, and advantages of the present disclosure clearer, the following further describes the embodiments of the present disclosure in detail with reference to the accompanying drawings.

Figure 1:
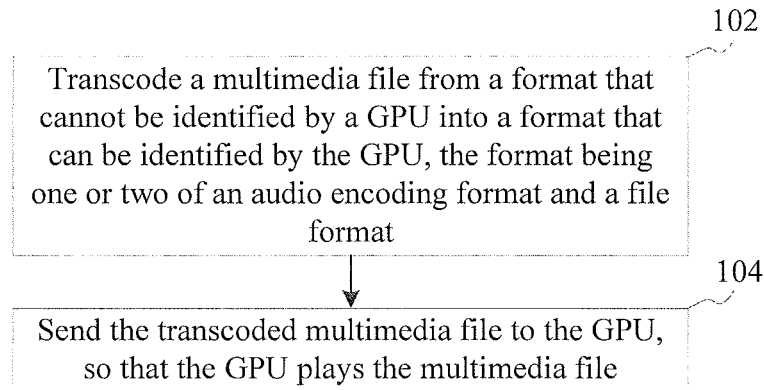
FIG. 1 is a flowchart of a multimedia playback method according to an embodiment of the present disclosure.

FIG. 1 is a flowchart of a multimedia playback method according to an embodiment of the present disclosure. The multimedia playback method is applicable to a terminal including a GPU and a CPU, and the terminal may be a smart television, a smart phone, a tablet computer, or the like. The multimedia playback method includes:

Step 102: Correspondingly transcode a multimedia file from a format that cannot be identified by a GPU into a format that can be processed by the GPU, the format being one or two of an audio encoding format and a file format.

When the audio encoding format of the multimedia file cannot be processed by the GPU, the multimedia file is transcoded from the audio encoding format into an audio encoding format that can be processed by the GPU; when the file format of the multimedia file cannot be processed by the GPU, the multimedia file is transcoded from the file format into a file format that can be processed by the GPU; and when neither the audio encoding format nor the file format of the multimedia file can be processed by the GPU, the audio encoding format and the file format of the multimedia file are correspondingly transcoded into the audio encoding format and the file format that can be processed by the GPU.

Step 104: Send the transcoded multimedia file to the GPU, so that the GPU plays the multimedia file.

To sum up, according to the multimedia playback method provided by this embodiment of the present disclosure, a format, in a multimedia file, that cannot be identified by a GPU is transcoded into a format that can be processed by the GPU, the format being one or two of an audio encoding format and a file format; and the transcoded multimedia file is sent to the GPU, so that the GPU plays the multimedia file, thereby solving a problem that a multimedia file cannot be played by a GPU when a format of the multimedia file cannot be processed by the GPU, and achieving an effect of expanding a range of multimedia files that can be played by the GPU.

In some embodiments, a computer first identifies the video encoding format, the audio encoding format, and the file format of a multimedia file. Next, the computer detects whether the video encoding format of the multimedia file can be processed by the GPU of the computer. When the video encoding format cannot be processed by the GPU, the computer then plays the multimedia file by using an application program that can process the video encoding format through the central processing unit of the computer. When the video encoding format can be processed by the GPU, the computer then detects whether the audio encoding format and the file format of the multimedia file can be processed by the GPU of the computer. If not, the computer then transcodes the multimedia file from the audio encoding format and/or the file format into the corresponding format(s) that can be processed by the GPU, and then sends the transcoded multimedia file to the GPU, so that the GPU plays the multimedia file.

Figure 2:
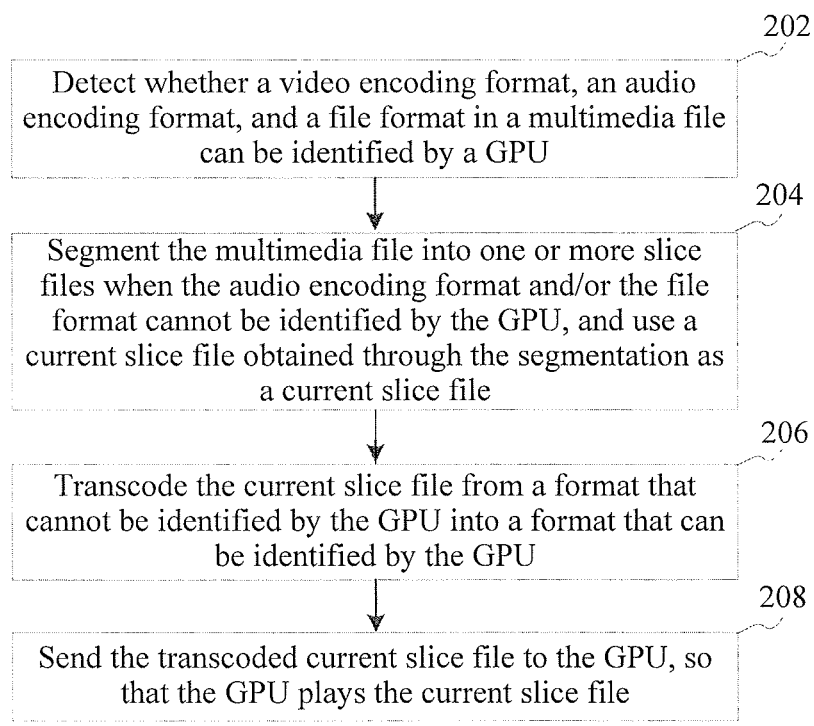
FIG. 2 is a flowchart of a multimedia playback method according to another embodiment of the present disclosure.

FIG. 2 is a flowchart of a multimedia playback method according to another embodiment of the present disclosure. The multimedia playback method is applicable to a terminal including a GPU and a CPU, and the terminal may be a smart television, a smart phone, a tablet computer, or the like. The multimedia playback method includes:

Step 202: Detect whether a video encoding format, an audio encoding format, and a file format in a multimedia file can be identified by a GPU.

Resource overheads of transcoding the file format of the multimedia file by a terminal are low, which is applicable to all multimedia files. When transcoding an encoding format of the multimedia file, a CPU needs to decode the multimedia file, encodes data obtained through decoding into a multimedia file in an encoding format specified by the GPU, and sends the transcoded multimedia file to the GPU for playback. In this case, resource overheads of transforming the encoding format of the multimedia file by the CPU are higher than resource overheads of playing the multimedia file by the CPU by more than twice. When the multimedia file is an audio file, because a data volume of the audio file is relatively small, the audio encoding format may be transcoded into an audio encoding format specified by the GPU, and the transcoded audio file is played by using the GPU, so as to save resources of the terminal, and improve playback performance. When the multimedia file is a video file, because a data volume of the video file is relatively large, resource overheads of transcoding the video encoding format are much greater than resource overheads of playing the video file by the CPU, and it is not proper to play the video file by using the GPU. Therefore, the terminal needs to detect whether the video encoding format, the audio encoding format, and the file format of the multimedia file can be processed by the GPU.

Specifically, metadata of the video file may be acquired, and the metadata is used to describe the encoding format and the file format of the multimedia file.

Step 204: Segment the multimedia file into one or more slice files when the audio encoding format and/or the file format cannot be processed by the GPU, and use a current slice file obtained through the segmentation as a current slice file.

The terminal may perform transcoding on the entire multimedia file, which has a high requirement on storage space in this case. Preferably, the terminal may further segment the multimedia file, and transcodes, each time, a slice file obtained through segmentation, which can reduce storage space.

Specifically, the step of segmenting the multimedia file into one or more slice files, and using a current slice obtained through the segmentation as a current slice file may include:

determining a first slice point of the multimedia file;

locating a playback moment after a duration T from the first slice point;

detecting a first key frame greater than or equal to the playback moment;

using the playback moment corresponding to the first key frame, as a second slice point; and segmenting a portion of the multimedia file between the first slice point and the second slice point as the current slice file.

When the multimedia file is segmented, the terminal may predefine duration T corresponding to the current slice file, locate a playback moment by the duration T backward based on the first slice point of the current multimedia file, determine whether the playback moment is a playback moment corresponding to a key frame, and if yes, use the playback moment as the second slice point, and segment a multimedia file between the first slice point and the second slice point as the current slice file; or if not, detect a first key frame after the playback moment, use a playback moment corresponding to the first key frame as the second slice point, and segment a multimedia file between the first slice point and the second slice point as the current slice file, so as to ensure that a start frame of the current slice file is the key frame. The key frame is an original image of one frame of image, which saves an entity of the image, and a player can only play a multimedia file normally starting from the key frame.

The duration T corresponding to each slice file is the same or different, and a transcoding time of the current slice file segmented according to the current duration T is less than a remaining playback time of a previous slice file segmented according to a previous duration T in the GPU. Preferably, the duration T may be further adjusted according a playback condition. For example, at the beginning of transcoding the slice file, T is set to be short, so as to ensure a short transcoding time when playback is started or the slice file is dragged for playback. As the playback proceeds, T may be prolonged. For example, if a previous slice file is played while the current slice file is transcoded, the transcoding time of the current slice file must be less than a remaining playback time of the previous slice file in the GPU; otherwise, playback of the multimedia file is intermittent. Generally, T is set to be less than 3 seconds, and a multimedia file after a user-specified playback moment can be quickly played even though the user drags a playback slider, which does not affect user experience.

Specifically, the step of determining a first slice point of the multimedia file may include: setting an initial playback moment of the multimedia file as a first slice point of the current slice file; or setting a second slice point of a previous slice file as the first slice point of the current slice file; or acquiring a user-specified playback moment, detecting a first key frame greater than or equal to the user-specified playback moment, and setting a playback moment corresponding to the first key frame as the first slice point of the current slice file.

If the current slice file is the first slice file of the multimedia file, the start playback moment of the multimedia file is used as the first slice point of the current slice file; or if the current slice file is not the first slice file of the multimedia file and slice files are played sequentially, the second slice point of the previous slice file is used as the first slice point of the current slice file; or if the user drags a playback slider of the multimedia file, the current slice file that is being transcoded currently and the previous slice file that is being played are discarded, it is determined whether a playback point specified by the user is the playback moment corresponding to the key frame, and if yes, the playback moment is used as the first slice point of the current slice file; or if not, a playback moment corresponding to the first key frame after the playback moment is used as the first slice point of the current slice file.

It should be additionally noted that if the video encoding format cannot be processed by the GPU, the multimedia file is played by using an application program that can process the video encoding format.

Step 206: Transcode the current slice file from a format that cannot be processed by the GPU into a format that can be processed by the GPU.

Specifically, when the audio encoding format of the multimedia file cannot be processed by the GPU, the audio encoding format of the multimedia file is transcoded into an audio encoding format that can be processed by the GPU; when the file format of the multimedia file cannot be processed by the GPU, the file format of the multimedia file is transcoded into a file format that can be processed by the GPU; and when neither the audio encoding format nor the file format of the multimedia file can be processed by the GPU, the audio encoding format and the file format of the multimedia file are correspondingly transcoded into the audio encoding format and the file format that can be processed by the GPU.

When the multimedia file is a video file, the terminal may transcode the file format into a file format specified by the GPU; for example, a video encoding format specified by the GPU may include H.264, and the file format specified by the GPU may include MP4; and then a video file in a video encoding format of H.264 may be transcoded from a Mkv format into an MP4 format. When the multimedia file is in an audio format, the terminal may transcode the audio file from a format that cannot be processed by the GPU into a format that can be processed by the GPU. For example, an audio encoding format specified by the GPU may include AAC, and a file format specified by the GPU may include MP4; and then an audio file in an audio encoding format of AAC may be transcoded from a Mkv format into an MP4 format; or an audio file in a file format of MP4 may be transcoded from an AC3 format into an AAC format; or an audio file may be transcoded from an Mkv format into an MP4 format and an AC3 format is transcoded into an AAC format, and the like.

Step 208: Send the transcoded current slice file to the GPU, so that the GPU plays the current slice file.

After receiving the current slice file, the GPU performs media separation, media decoding, and media rendering on the current slice file, which is the existing technology, and is not further described herein.

Preferably, after sending the transcoded current slice file to the GPU, the method may further include:

when a second slice point of the current slice file is not the last playback moment of the multimedia file, setting a next slice file starting from the second slice point and transcoding the next slice file.

When transcoding the next slice file, the CPU may play the current slice file by using the GPU; when playback of the current slice file is completed, send the next slice file to the GPU for playback, and segment and transcode a multimedia file after the next slice file, and so on, until playback of the multimedia file is completed.

Further, a slice file on a network may be further acquired in a streaming media manner, and a format of the slice file is identified; if an audio encoding format and/or a file format of the slice file cannot be processed by the GPU, the slice file is transcoded, and the transcoded slice file is sent to the GPU, so that the GPU plays the slice file; and if a video encoding format of the slice file cannot be processed by the GPU, the slice file is played by using an application program that can process the video encoding format.

To sum up, according to the multimedia playback method provided by this embodiment of the present disclosure, a format, in a multimedia file, that cannot be identified by a GPU is transcoded into a format that can be processed by the GPU, the format being one or two of an audio encoding format and a file format; and the transcoded multimedia file is sent to the GPU, so that the GPU plays the multimedia file, thereby solving a problem that a multimedia file cannot be played by a GPU when a format of the multimedia file cannot be processed by the GPU, and achieving an effect of expanding a range of multimedia files that can be played by the GPU. In addition, if a second slice point of a current slice file is not the last playback moment of the multimedia file, a next slice file is segmented based on the second slice point, and the next slice file is transcoded; and the current slice file can be played while the next slice file is transcoded, thereby achieving an effect of improving playback efficiency.

Figure 3:
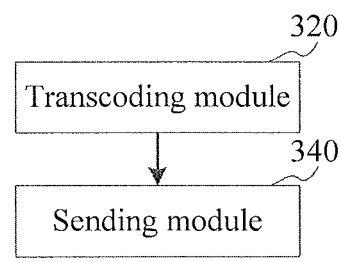
FIG. 3 is a schematic structural diagram of a multimedia playback apparatus according to an embodiment of the present disclosure.

FIG. 3 is a structural block diagram of a multimedia playback apparatus according to an embodiment of the present disclosure. The multimedia playback apparatus may be implemented, by using software or hardware or a combination thereof, to be an entire terminal that includes a GPU and a CPU or be a part of the terminal, and the terminal may be a smart television, a smart phone, a tablet computer, or the like. The multimedia playback apparatus includes: a transcoding module 320 and a sending module 340.

The transcoding module 320 is configured to transcode a multimedia file from a format that cannot be identified by a GPU into a format that can be processed by the GPU, the format being one or two of an audio encoding format and a file format.

The sending module 340 is configured to send the transcoded multimedia file to the GPU, so that the GPU plays the multimedia file.

To sum up, the multimedia playback apparatus provided by this embodiment of the present disclosure transcodes a multimedia file from a format that cannot be identified by a GPU into a format that can be processed by the GPU, the format being one or two of an audio encoding format and a file format; and sends the transcoded multimedia file to the GPU, so that the GPU plays the multimedia file, thereby solving a problem that a multimedia file cannot be played by a GPU when a format of the multimedia file cannot be processed by the GPU, and achieving an effect of expanding a range of multimedia files that can be played by the GPU.

Figure 4:
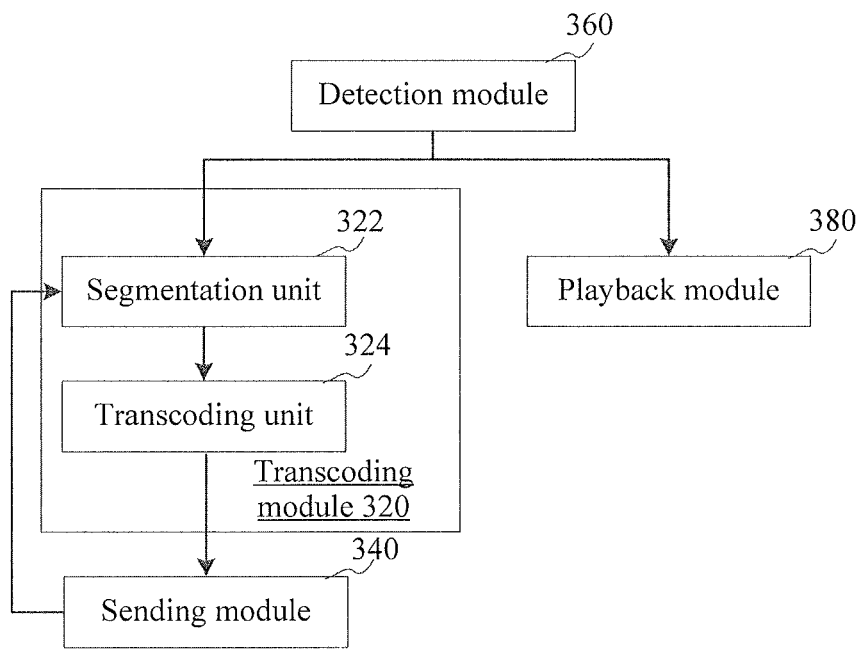
FIG. 4 is a schematic structural diagram of a multimedia playback apparatus according to another embodiment of the present disclosure.

FIG. 4 is a structural block diagram of a multimedia playback apparatus according to Embodiment 4 of the present disclosure. The multimedia playback apparatus may be implemented, by using software or hardware or a combination thereof, to be an entire terminal that includes a GPU and a CPU or be a part of the terminal, and the terminal may be a smart television, a smart phone, a tablet computer, or the like. The multimedia playback apparatus includes: a transcoding module 320 and a sending module 340.

The transcoding module 320 is configured to transcode a multimedia file from a format that cannot be identified by a GPU into a format that can be processed by the GPU, the format being one or two of an audio encoding format and a file format.

The sending module 340 is configured to send the multimedia file transcoded by the transcoding module 320 to the GPU, so that the GPU plays the multimedia file.

In a first possible implementation manner of this embodiment of the present disclosure, the transcoding module 320 may include:

a segmentation unit 322, configured to segment the multimedia file, and use a file currently obtained through the segmentation as a current slice file; and a transcoding unit 324, configured to transcode the current slice file segmented by the segmentation unit 322 from a format that cannot be processed by the GPU into a format that can be processed by the GPU; and correspondingly, the sending module 340 is specifically configured to send the transcoded current slice file to the GPU, so that the GPU plays the current slice file.

Figure 5:
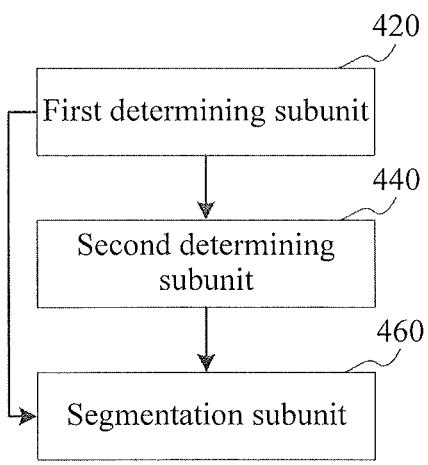
FIG. 5 is a schematic structural diagram of a segmentation unit according to another embodiment of the present disclosure.

Refer to FIG. 5, which is a structural block diagram of a segmentation unit according to an embodiment of the present disclosure. In a second possible implementation manner of this embodiment of the present disclosure, the segmentation unit 322 may include:

a first determining subunit 420, configured to determine a first slice point of the multimedia file;

a second determining subunit 440, configured to locate a playback moment by duration T backward based on the first slice point determined by the first determining subunit 420, detect a first key frame greater than or equal to the playback moment, and use the playback moment corresponding to the first key frame, as a second slice point; and a segmentation subunit 460, configured to segment a multimedia file between the first slice point determined by the first determining subunit 420 and the second slice point determined by the second determining subunit 440 as the current slice file.

In a third possible implementation manner of this embodiment of the present disclosure, the first determining subunit 420 is specifically configured to determine that a start playback moment of the multimedia file is a first slice point of the current slice file; or determine that a second slice point of a previous slice file is a first slice point of the current slice file; or acquire a user-specified playback moment, detect a first key frame greater than or equal to the user-specified playback moment, and determine that a playback moment corresponding to the first key frame is a first slice point of the current slice file.

In a fourth possible implementation manner of this embodiment of the present disclosure, the transcoding module 320 is further configured to: after the sending module 340 sends the transcoded current slice file to the GPU, segment, if a second slice point of the current slice file is not the last playback moment of the multimedia file, a next slice file based on the second slice point, and transcode the next slice file.

In a fifth possible implementation manner of this embodiment of the present disclosure, duration T corresponding to each slice file is the same or different, and a transcoding time of the current slice file segmented according to the current duration T is less than a remaining playback time of a previous slice file segmented according to a previous duration T in the GPU.

Refer to FIG. 4, in a sixth possible implementation manner of this embodiment of the present disclosure, the apparatus may further include:

a detection module 360, configured to: before the transcoding module 320 transcodes the multimedia file from the format that cannot be processed by the GPU into the format that can be processed by the GPU, detect whether a video encoding format, the audio encoding format, and the file format of the multimedia file can be processed by the GPU, where the transcoding module 320 is further configured to: if the audio encoding format and/or the file format cannot be processed by the GPU, transcode the multimedia file from the file that cannot be processed by the GPU into the format that can be processed by the GPU; and a playback module 380, configured to play, if the video encoding format cannot be processed by the GPU, the multimedia file by using an application program that can identify the encoding format.

To sum up, the multimedia playback apparatus provided by this embodiment of the present disclosure transcodes a multimedia file from a format that cannot be identified by a GPU into a format that can be processed by the GPU, the format being one or two of an audio encoding format and a file format; and sends the transcoded multimedia file to the GPU, so that the GPU plays the multimedia file, thereby solving a problem that a multimedia file cannot be played by a GPU when a format of the multimedia file cannot be processed by the GPU, and achieving an effect of expanding a range of multimedia files that can be played by the GPU. In addition, if a second slice point of a current slice file is not the last playback moment of the multimedia file, a next slice file is segmented based on the second slice point, and the next slice file is transcoded; and the current slice file can be played while the next slice file is transcoded, thereby achieving an effect of improving playback efficiency.

It should be noted that, the above functional modules are only described for exemplary purposes when the multimedia playback apparatus provided by the foregoing embodiment plays a multimedia file. In actual applications, the foregoing functions may be allocated to different functional modules according to specific needs, which means that the internal structure of the multimedia playback apparatus is divided into different functional modules to complete all or some of the functions described above. In addition, the multimedia playback apparatus provided by the foregoing embodiment is based on the same concept as the embodiment of the multimedia playback method. For the specific implementation process, refer to the method embodiment, and details are not described herein again.

Figure 6:
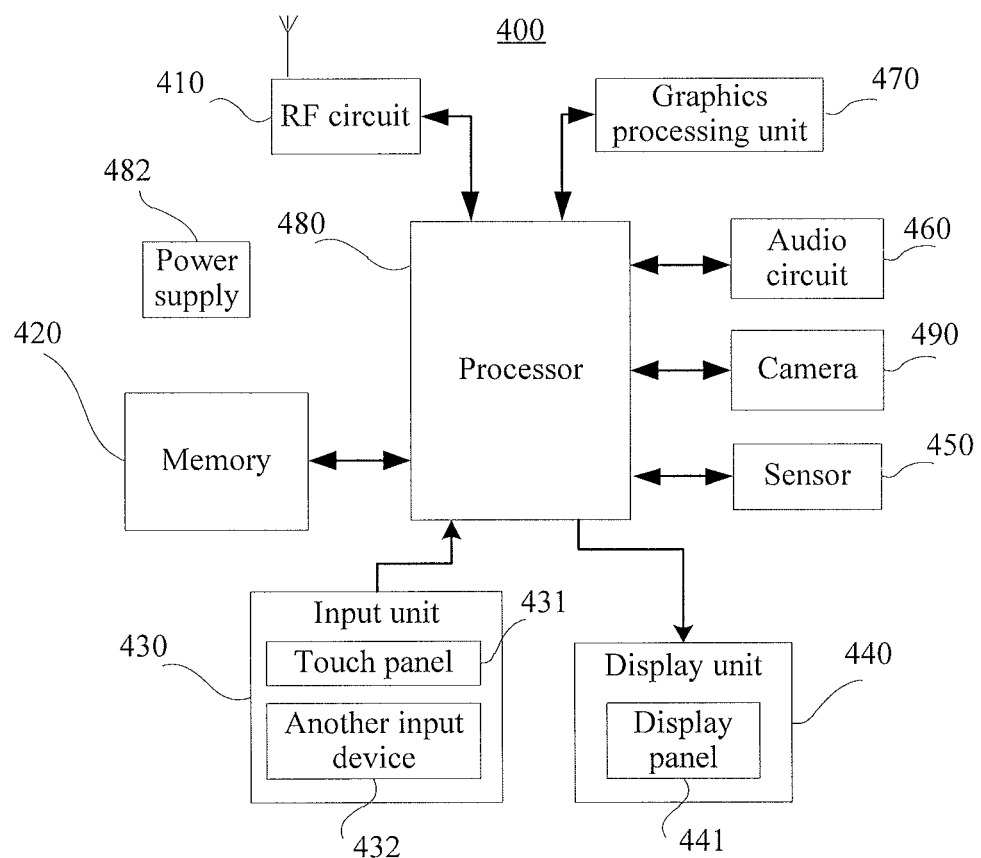
FIG. 6 is a schematic structural diagram of a terminal according to an embodiment of the present disclosure.

FIG. 6 is a structural block diagram of a terminal according to an embodiment of the present disclosure. The terminal is used to implement the multimedia playback method provided by the foregoing embodiment. The terminal in this embodiment of the present disclosure may include one or more of the following components: a processor, configured to perform computer program instructions to implement various procedures and methods, a random access memory (RAM) and a read-only memory (ROM) that are configured to store information and program instructions, a memory configured to store data and information, an I/O device, an interface, an antenna, and the like. Specifically:

A terminal 400 may include components such as a radio frequency (RF) circuit 410, a memory 420, an input unit 430, a display unit 440, a sensor 450, an audio circuit 460, a GPU 470, a processor 480, a power supply 482, and a camera 490. A person skilled in the art may understand that the structure of the terminal shown in FIG. 6 does not constitute a limitation to the terminal, and the terminal may include more components or fewer components than those shown in the figure, or some components may be combined, or a different component deployment may be used.

The following specifically describes the components of the terminal 400 with reference to FIG. 6.

The RF circuit 410 may be configured to receive and send signals during an information receiving and sending process or a call process. Particularly, the RF circuit 410 receives downlink information from a base station, then delivers the downlink information to the processor 480 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 410 may also communicate with a network and another device by wireless communication. The wireless communication may use any communications standard or protocol, which includes, but is not limited to, Global System for Mobile communications (GSM), a general packet radio service (GPRS), Code Division Multiple Access (CDMA), Wideband Code Division Multiple Access (WCDMA), Long Term Evolution (LTE), e-mail, a Short Messaging Service (SMS), and the like.

The memory 420 may be a non-transitory computer readable storage medium configured to store a software program and module. The processor 480 runs the software program and module that are stored in the memory 420, to implement various functional applications and data processing of the terminal 400. The memory 420 may mainly include a program storage area and a data storage area. The program storage area may store an operating system, an application program required by at least one function (such as a sound playback function and an image display function), and the like. The data storage area may store data (such as audio data and a telephone directory) created according to use of the terminal 400, and the like. In addition, the memory 420 may include a high speed RAM, and may also include a non-volatile memory such as at least one magnetic disk storage device, a flash memory, or another volatile solid storage device.

The input unit 430 may be configured to receive input digit or character information, and generate a keyboard signal input related to the user setting and function control of the terminal 400. Specifically, the input unit 430 may include a touch panel 431 and another input device 432. The touch panel 431 may also be referred to as a touch screen, may collect a touch operation of a user on or near the touch panel 431 (such as an operation of a user on or near the touch panel 431 by using any suitable object or accessory, such as a finger or a stylus), and drive a corresponding connection apparatus according to a preset program. Optionally, the touch panel 431 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 480. Moreover, the touch controller can receive and execute a command sent from the processor 480. In addition, the touch panel 431 may be a resistive, capacitive, infrared, or surface sound wave type touch pane. In addition to the touch panel 431, the input unit 430 may further include the another input device 432. Specifically, the another input device 432 may include, but is not limited to, one or more of a physical keyboard, a functional key (such as a volume control key or a switch key), a track ball, a mouse, and a joystick.

The display unit 440 may be configured to display information input by the user or information provided for the user, and various menus of the terminal 400. The display unit 440 may include a display panel 441. Optionally, the display panel 441 may be configured by using a liquid crystal display (LCD), an organic light-emitting diode (OLED), or the like. Further, the touch panel 431 may cover the display panel 441. After detecting a touch operation on or near the touch panel 431, the touch panel 431 transfers the touch operation to the processor 480, so as to determine a type of the touch event. Then, the processor 480 provides a corresponding visual output on the display panel 441 according to the type of the touch event. Although in FIG. 6, the touch panel 431 and the display panel 441 are used as two separate components to implement input and output functions of the terminal 400, in some embodiments, the touch panel 431 and the display panel 441 may be integrated to implement the input and output functions of the terminal 400.

The terminal 400 may further include at least one sensor 450, such as a gyro sensor, a magnetic induction sensor, an optical sensor, a motion sensor, and other sensors. Specifically, the optical sensor may include an ambient light sensor and a proximity sensor. The ambient light sensor may adjust luminance of the display panel 441 according to brightness of the ambient light. The proximity sensor may switch off the display panel 441 and/or backlight when the terminal 400 is moved to the ear. As one type of motion sensor, an acceleration sensor may detect magnitude of accelerations in various directions (generally on three axes), may detect magnitude and a direction of the gravity when static, and may be applied to an application that recognizes the attitude of the terminal (for example, switching between landscape orientation and portrait orientation, a related game, and magnetometer attitude calibration), a function related to vibration identification (such as a pedometer or a knock), or the like. Other sensors, such as a barometer, a hygrometer, a thermometer, and an infrared sensor, which may be configured in the terminal 400, are not further described herein.

The audio circuit 460, a loudspeaker 461, and a microphone 462 may provide audio interfaces between the user and the terminal 400. The audio circuit 460 may convert received audio data into an electric signal and transmit the electric signal to the loudspeaker 461. The loudspeaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 180 sends the audio data to, for example, another terminal by using the RF circuit 410, or outputs the audio data to the memory 420 for further processing.

The terminal 400 further includes the GPU 470, and the terminal 400 may help the user to play a multimedia file by using the GPU 470.

The processor 480 is the control center of the terminal 400, and is connected to various parts of the entire terminal by using various interfaces and lines. By running or performing the software program and/or module stored in the memory 420, and invoking data stored in the memory 420, the processor 480 performs various functions and data processing of the terminal 400, thereby performing overall monitoring on the terminal. Optionally, the processor 480 may include one or more processing units. Preferably, the processor 480 may integrate an application processor and a modem. The application processor mainly processes an operating system, a user interface, an application program, and the like. The modem mainly processes wireless communication. It may be understood that the foregoing modem may be not integrated into the processor 480.

The terminal 400 further includes the power supply 482 (such as a battery) for supplying power to the components. Preferably, the power supply may be logically connected to the processor 480 by using a power management system, thereby implementing functions such as charging, discharging, and power consumption management by using the power supply management system.

The camera 490 generally includes a lens, an image sensor, an interface, a digital signal processor, a CPU, a display screen, and the like. The lens is fastened above the image sensor, and a focus may be changed by manually adjusting the lens; the image sensor functions as a "film" of a traditional camera, and is the heart of image acquisition by the camera; the interface is configured to connect the camera to a terminal motherboard in a connection manner of using a flat cable and a board to board connector, or a spring, and sends the acquired image to the memory 420; and the digital signal processor processes the acquired image by means of a mathematical operation, converts an acquired analog image into a digital image, and sends the digital image to the memory 420 through the interface.

Although not shown in the figure, the terminal 400 may further include a Bluetooth module, and the like, which are not further described herein.

In addition to including the one or more processors 480, the terminal 400 further includes the memory 420, where the memory 420 stores one or more program modules stored in the memory, and the one or more program modules are configured to be performed by the one or more processors 480, and the one or more program modules include instructions used for implementing the multimedia playback method shown in FIG. 1 or FIG. 2.

The sequence numbers of the foregoing embodiments of the present disclosure are merely for the convenience of description, and do not imply the preference among the embodiments.

A person of ordinary skilled in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A multimedia playback method, comprising:
   at a computing device having one or more processors and memory for storing one or more program modules to be executed by the one or more processors:
      identifying a video encoding format, an audio encoding format, and a file format of a multimedia file;
      detecting whether the video encoding format of the multimedia file can be processed by a graphics processing unit (GPU);
      when the video encoding format cannot be processed by the GPU, playing the multimedia file by using an application program that can process the video encoding format through a central processing unit;
      when the video encoding format can be processed by the GPU but at least one of the audio encoding format and the file format cannot be processed by the GPU, transcoding the multimedia file from the at least one format into a corresponding format that can be processed by the GPU, further comprising:
         segmenting the multimedia file into one or more slice files, and using a current slice obtained through the segmentation as a current slice file;
         determining a first slice point of the multimedia file;
         locating a playback moment after a duration T from the first slice point;
         detecting a first key frame greater than or equal to the playback moment; and
         using the playback moment corresponding to the first key frame, as a second slice point;
         segmenting a portion of the multimedia file between the first slice point and the second slice point as the current slice file;
         transcoding the current slice file from a format that cannot be processed by the GPU into a format that can be processed by the GPU; and
         sending the transcoded current slice file to the GPU, so that the GPU plays the current slice file; and
      sending the transcoded multimedia file to the GPU, so that the GPU plays the multimedia file.

2. The method according to claim 1, wherein the step of determining a first slice point of the multimedia file comprises:
   setting an initial playback moment of the multimedia file as a first slice point of the current slice file; or
   setting a second slice point of a previous slice file as the first slice point of the current slice file; or
   acquiring a user-specified playback moment, detecting a first key frame greater than or equal to the user-specified playback moment, and setting a playback moment corresponding to the first key frame as the first slice point of the current slice file.

3. The method according to claim 1, further comprising:
   after sending the transcoded current slice file to the GPU:
      when a second slice point of the current slice file is not the last playback moment of the multimedia file, setting a next slice file starting from the second slice point and transcoding the next slice file.

4. The method according to claim 3, wherein the duration T corresponding to each slice file is the same or different, and a transcoding time of the current slice file segmented according to the current duration T is less than a remaining playback time of a previous slice file segmented according to a previous duration T in the GPU.

5. A computing terminal, comprising:
   one or more processors;
   memory; and
   one or more program modules stored in the memory, the one or more program modules to be performed by the one or more processors, and the one or more program modules comprising instructions for performing the following operations:
      identifying a video encoding format, an audio encoding format, and a file format of a multimedia file;
      detecting whether the video encoding format of the multimedia file can be processed by a GPU;
      when the video encoding format cannot be processed by the GPU, playing the multimedia file by using an application program that can process the video encoding format through a central processing unit;
      when the video encoding format can be processed by the GPU but at least one of the audio encoding format and the file format cannot be processed by the GPU, transcoding the multimedia file from the at least one format into a corresponding format that can be processed by the GPU, further comprising:
         segmenting the multimedia file into one or more slice files, and using a current slice obtained through the segmentation as a current slice file;
         determining a first slice point of the multimedia file;
         locating a playback moment after a duration T from the first slice point
         detecting a first key frame greater than or equal to the playback moment; and
         using the playback moment corresponding to the first key frame, as a second slice point;

segmenting a portion of the multimedia file between the first slice point and the second slice point as the current slice file;

transcoding the current slice file from a format that cannot be processed by the GPU into a format that can be processed by the GPU; and sending the transcoded current slice file to the GPU, so that the GPU plays the current slice file; and sending the transcoded multimedia file to the GPU, so that the GPU plays the multimedia file.

6. The computing terminal according to claim 5, wherein the operation of determining a first slice point of the multimedia file comprises:

setting an initial playback moment of the multimedia file as a first slice point of the current slice file; or setting a second slice point of a previous slice file as the first slice point of the current slice file; or acquiring a user-specified playback moment, detecting a first key frame greater than or equal to the user-specified playback moment, and setting a playback moment corresponding to the first key frame as the first slice point of the current slice file.

7. The computing terminal according to claim 5, wherein the one or more program modules further comprise instructions for performing the following operations:

after sending the transcoded current slice file to the GPU:
when a second slice point of the current slice file is not the last playback moment of the multimedia file, setting a next slice file starting from the second slice point and transcoding the next slice file.

8. The computing terminal according to claim 7, wherein the duration T corresponding to each slice file is the same or different, and a transcoding time of the current slice file segmented according to the current duration T is less than a remaining playback time of a previous slice file segmented according to a previous duration T in the GPU.

9. A non-transitory computer readable storage medium storing one or more program modules to be executed by a computing terminal having one or more processors, the one or more program modules comprising instructions for performing the following operations:

identifying a video encoding format, an audio encoding format, and a file format of a multimedia file;

detecting whether the video encoding format of the multimedia file can be processed by a GPU;

when the video encoding format cannot be processed by the GPU, playing the multimedia file by using an application program that can process the video encoding format through a central processing unit;

when the video encoding format can be processed by the GPU but at least one of the audio encoding format and the file format cannot be processed by the GPU, transcoding the multimedia file from the at least one format into a corresponding format that can be processed by the GPU, further comprising:

segmenting the multimedia file into one or more slice files, and using a current slice obtained through the segmentation as a current slice file;

determining a first slice point of the multimedia file;

locating a playback moment after a duration T from the first slice point;

detecting a first key frame greater than or equal to the playback moment; and using the playback moment corresponding to the first key frame, as a second slice point;

segmenting a portion of the multimedia file between the first slice point and the second slice point as the current slice file;

transcoding the current slice file from a format that cannot be processed by the GPU into a format that can be processed by the GPU; and sending the transcoded current slice file to the GPU, so that the GPU plays the current slice file; and sending the transcoded multimedia file to the GPU, so that the GPU plays the multimedia file.

10. The non-transitory computer readable storage medium according to claim 9, wherein the operation of determining a first slice point of the multimedia file comprises:

setting an initial playback moment of the multimedia file as a first slice point of the current slice file; or setting a second slice point of a previous slice file as the first slice point of the current slice file; or acquiring a user-specified playback moment, detecting a first key frame greater than or equal to the user-specified playback moment, and setting a playback moment corresponding to the first key frame as the first slice point of the current slice file.

11. The non-transitory computer readable storage medium according to claim 9, wherein the one or more program modules further comprise instructions for performing the following operations:

after sending the transcoded current slice file to the GPU:
when a second slice point of the current slice file is not the last playback moment of the multimedia file, setting a next slice file starting from the second slice point and transcoding the next slice file.

12. The non-transitory computer readable storage medium according to claim 11, wherein the duration T corresponding to each slice file is the same or different, and a transcoding time of the current slice file segmented according to the current duration T is less than a remaining playback time of a previous slice file segmented according to a previous duration T in the GPU.

* * * * *